United States Patent
Gur et al.

(10) Patent No.: US 11,204,655 B2
(45) Date of Patent: *Dec. 21, 2021

(54) ACTIVE STYLUS COMMUNICATION WITH A DIGITIZER

(71) Applicant: Microsoft Technology Licensing, LLC, Redmond, WA (US)

(72) Inventors: Arie Gur, Kiryat-Ono (IL); Amir Zyskind, Natania (IL); Ilan Geller, Pardesia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,576

(22) Filed: Jul. 1, 2020

(65) Prior Publication Data

US 2020/0333890 A1 Oct. 22, 2020

Related U.S. Application Data

(63) Continuation of application No. 14/986,767, filed on Jan. 4, 2016, now Pat. No. 10,739,875.

(Continued)

(51) Int. Cl.
*G06F 3/033* (2013.01)
*G06F 3/038* (2013.01)
(Continued)

(52) U.S. Cl.
CPC ........ *G06F 3/0383* (2013.01); *G06F 3/03545* (2013.01); *G06F 3/041* (2013.01);
(Continued)

(58) Field of Classification Search
USPC ................ 345/173, 174, 179, 156; 715/753; 382/120; 178/18.06
See application file for complete search history.

(56) References Cited

U.S. PATENT DOCUMENTS

2005/0189154 A1* 9/2005 Perski ................... G06F 3/0442
178/18.06
2009/0141008 A1* 6/2009 Johnson .............. G06F 3/04166
345/179

(Continued)

FOREIGN PATENT DOCUMENTS

CN 102640097 A 8/2012
CN 103186302 A 7/2013
(Continued)

OTHER PUBLICATIONS

"Third Office Action and Search Report Issued in Chinese Patent Application No. 201680004967.4", dated Sep. 1, 2020, 17 Pages.
(Continued)

*Primary Examiner* — Thuy N Pardo (57) ABSTRACT

A method includes detecting presence of a handheld device in proximity of a touch enabled device and negotiating communication capabilities between the handheld device and a digitizer system of the touch enabled device. At least one of the handheld device and the digitizer system is configured to match a defined communication capability of the other of the at least one of the handheld device and digitizer system. Input from the handheld device is tracked via an electrostatic communication channel between the handheld device and the digitizer system based on the defined communication configuration.

20 Claims, 4 Drawing Sheets

Related U.S. Application Data (60) Provisional application No. 62/099,524, filed on Jan. 4, 2015.

(51) Int. Cl.
*G06F 3/044* (2006.01)
*G06F 3/0354* (2013.01)
*G06F 3/041* (2006.01)

(52) U.S. Cl.
CPC ............ *G06F 3/044* (2013.01); *G06F 3/0441* (2019.05); *G06F 3/0442* (2019.05); *G06F 3/0446* (2019.05)

(56) References Cited

U.S. PATENT DOCUMENTS

| | | | | |
|---|---|---|---|---|
| 2010/0073323 | A1* | 3/2010 | Geaghan | G06F 3/0446 345/174 |
| 2012/0242603 | A1* | 9/2012 | Engelhardt | G06F 3/0383 345/173 |
| 2014/0375573 | A1* | 12/2014 | Idzik | G06F 3/03545 345/173 |
| 2015/0087230 | A1* | 3/2015 | Han | G06F 3/044 455/41.1 |
| 2015/0186093 | A1* | 7/2015 | Kim | G06F 1/1632 345/174 |
| 2015/0341401 | A1* | 11/2015 | Lee | G06Q 10/101 715/753 |
| 2015/0346855 | A1* | 12/2015 | Momchilov | G09G 5/003 345/173 |
| 2015/0363012 | A1* | 12/2015 | Sundara-Rajan | G06F 3/04162 345/179 |
| 2016/0070413 | A1* | 3/2016 | Geaghan | G06F 3/04186 345/174 |
| 2016/0253568 | A1* | 9/2016 | Idzik | G06F 3/0416 382/120 |
| 2017/0109516 | A1* | 4/2017 | Engelhardt | G06F 3/03545 |

FOREIGN PATENT DOCUMENTS

| | | |
|---|---|---|
| CN | 103492988 A | 1/2014 |
| CN | 103534670 A | 1/2014 |
| CN | 108227980 A | 6/2018 |
| CN | 109196463 A | 1/2019 |
| JP | 2014081784 A | 5/2014 |

OTHER PUBLICATIONS

"Office Action Issued in Indian Patent Application No. 201747018858", dated Feb. 17, 2021, 7 Pages.

* cited by examiner

ACTIVE STYLUS COMMUNICATION WITH A DIGITIZER

RELATED APPLICATION

This application is a continuation of and claims priority to U.S. application Ser. No. 14/986,767, entitled "ACTIVE STYLUS COMMUNICATION WITH A DIGITIZER," filed Jan. 4, 2016 which claims the benefit of priority under 35 USC § 119(e) of U.S. Provisional Patent Application No. 62/099,524 filed on Jan. 4, 2015, the contents of which are incorporated herein by reference in their entirety.

BACKGROUND

Signal emitting styluses, e.g. active styluses are known in the art for use with a digitizer system. Position detection of the stylus provides input to a computing device associated with the digitizer system and is interpreted as user commands Often, the digitizer system is integrated with a display screen, e.g. to form a touch screen. Position of the stylus over the screen is correlated with virtual information portrayed on the screen. The signal emitted by the stylus may include information such as pressure applied on the writing tip and stylus identification. The signal is decoded by the digitizer system to obtain the information.

Digitizer systems typically include a matrix of electrode junctions arranged in rows and columns. Stylus location may be tracked by sampling output in both row and column direction. Tracking is based on detecting a signal emitted by a tip of the stylus and picked up by the digitizer sensor due to electrostatic coupling established between the tip and a portion of the matrix of electrode junctions. Digitizer systems that track signals emitted by the stylus also typically track input provided with a finger or conductive object. A mutual capacitive sensor is one type of digitizer sensor for such digitizer systems. Mutual capacitive detection allows multi-touch operation where multiple fingers, palms or conductive objects are tracked at the same time.

SUMMARY

The disclosure in some embodiments relates to a method for active stylus communication with a digitizer system of a computing device and may be applied to active communication of other handheld devices with a digitizer system of a computing device. The method provides for negotiating capabilities between a stylus and a digitizer system and configuring an electrostatic communication channel between them based on the negotiating. The capability negotiating may help optimize communication between a particular stylus and digitizer system pair. A different configuration may be defined for styluses communicating with a same digitizer system or for a same stylus communicating with different digitizer systems. A configuration between a stylus and a digitizer system may be stored in the computing device, in the stylus or in external memory, e.g. a cloud memory and may be fetched based on identifying the stylus, the digitizer system or both.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

In exemplary embodiments of the present disclosure, a computing device that is touch enabled is configured to identify capabilities of a stylus (or other handheld devices) coming into proximity with the device and to configure communication between the stylus and a touch screen of the computing device based on the identified capabilities. In some exemplary embodiments, operation of the touch screen is adapted to accommodate detected capabilities of the stylus.

Optionally, the computing device instructs the stylus to adjust its configuration to accommodate capabilities of the touch screen. Alternatively or additionally, a stylus is configured to identify capabilities of a touch screen of a computing device and to adapt its transmission based on the identified capabilities. Optionally, a negotiating session allows both the stylus and the computing device to declare capabilities, request information and configure an electrostatic communication channel between them. The electrostatic communication channel is the channel at which a conductive portion of the stylus that is in proximity to the digitizer sensor transmits a signal that is picked up by the touch screen or receives a signal that is transmitted by the computing device to the touch screen.

In some exemplary embodiments, based on input from the computing device, the stylus may be configured to selectively transmit information that can be recognized or used by the computing device. Information supported by the computing device may include for example, stylus identification, authorization associated with the stylus, pressure applied on the stylus tip, tilt of the stylus, battery level, output from one or sensors on the stylus, ink color of the stylus.

In some exemplary embodiments, configuration of the electrostatic communication channel may define data structure and timing of a signal transmitted by the stylus that can be recognized by the touch screen or data structure and timing of a signal transmitted on the touch screen that can be recognized by the stylus. Optionally, a stylus may transmit one or more tables (and/or formulas) to the computing device based on which the computing device can decode the information.

In some exemplary embodiments, capability identification or negotiation is communicated via the electrostatic communication channel or via an auxiliary channel, e.g. Bluetooth, near field communication (NFC), radio frequency communication, e.g. using electromagnetic signals and wired (e.g. USB) tethered connection to the computing device.

In exemplary embodiments of the present disclosure, communication of electrostatic communication capabilities for pairing the devices occurs when one of the stylus or the computing device becomes aware of the other, e.g. after a defined period of no communication has lapsed. Awareness may be via the electrostatic communication channel or via alternate channels, e.g. Bluetooth, near field communication (NFC), and USB tethered connection to the computing device. Once the communication is configured, stylus or computing device may periodically transmit a code or to confirm the continued configuration. Optionally, the stylus or computing device may initiate a change in the configuration during stylus interaction with the computing device. Optionally, pairing occurs while the stylus is not interacting with the touch screen.

Figure 1:
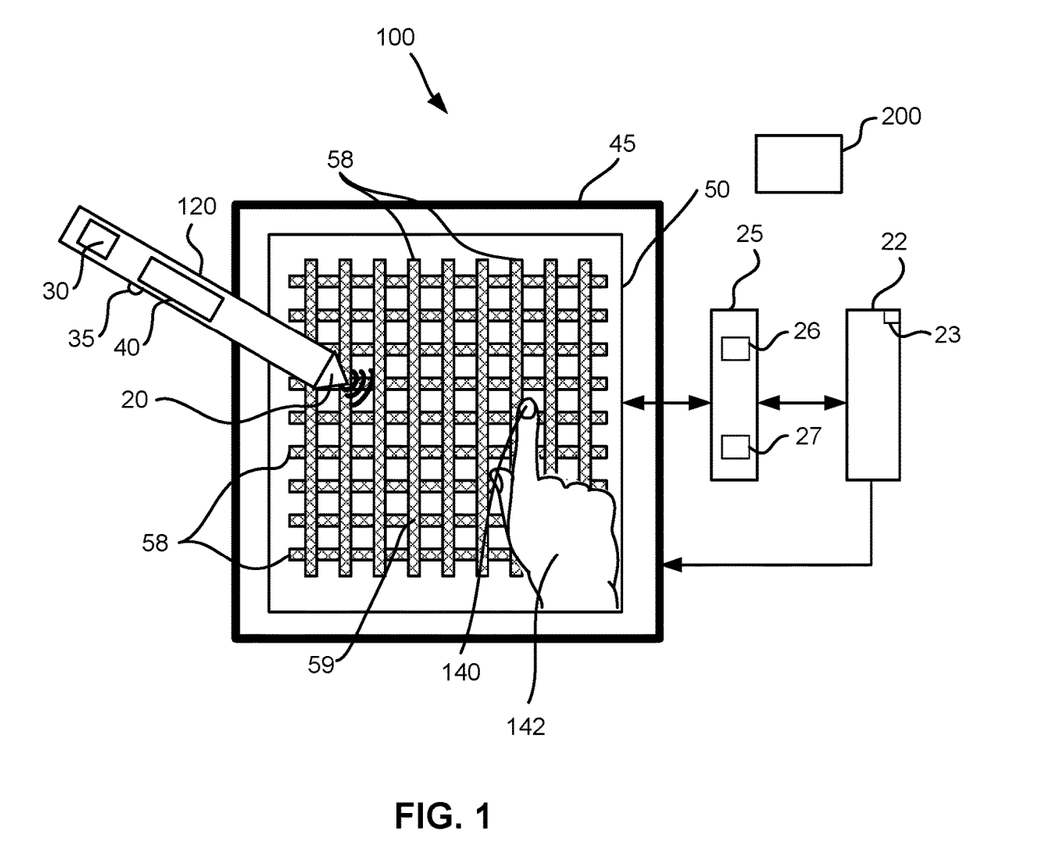
FIG. 1 is a simplified block diagram of an exemplary touch enabled computing device in accordance with some embodiments of the present disclosure.

Reference is now made to FIG. 1 showing a simplified block diagram of an exemplary touch enabled computing device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row and column conductive strips 58 forming grid lines of the grid based sensor. Typically, conductive strips 58 are electrically insulated from one another and each of conductive strips is connected at least at on one end to digitizer circuitry 25.

Typically, conductive strips 58 are arranged to enhance capacitive coupling between row and column conductive strips, e.g. around junctions 59 formed between rows and columns. The capacitive coupling formed between the row and column conductive strips is sensitive to presence of conductive and dielectric objects. Alternatively, digitizer sensor formed with a matrix of electrode junctions that is not necessarily constructed based on row and column conductive strips.

According to some embodiments of the present disclosure, conductive strips 58 are operative to detect touch of one or more fingertips 140 or hand 142 or other conductive objects as well as input by stylus 120 transmitting an electromagnetic signal typically via the writing tip of the stylus. Digitizer circuitry 25 applies mutual capacitance detection or a self-capacitance for sensing a touch signal from touch (or hover) of fingertip 140. Typically, during mutual capacitance and self-capacitance detection, digitizer circuitry 25 sends a triggering signal, e.g. pulse to one or more conductive strips 58 of digitizer sensor 50 and samples output from conductive strips 58 in response to the triggering and/or interrogation. In some embodiments, some or all of conductive strips 58 along one axis of the grid are triggered simultaneously or in a consecutive manner, and in response to each triggering, outputs from conductive strips 58 on the other axis are sampled. Typically, this procedure provides for detecting coordinates of multiple fingertips 140 touching sensor 50 at the same time (multi-touch).

Digitizer circuitry 25 typically includes finger detection engine 26 for managing the triggering signal, for processing the touch signal and for tracking coordinates of one or more fingertips 140. Digitizer circuitry 25 also typically includes stylus detection engine 27 for synchronizing with stylus 120, for processing input received by stylus 120 and/or for tracking coordinates of stylus 120. Typically, output from both row and column conductive strips 58, e.g. from two perpendicular axes are sampled to detect coordinates of stylus 120.

Input received by stylus 120 may include information directly related to stylus 120, related to an environment around the stylus 120, to a user using stylus 120, to privileges allotted to the stylus 120, capabilities of stylus 120, or information received from a third party device. Information related to the stylus may include indications of a pressed button(s) 35, pressure level on tip 20, tilt, identification, manufacturer, version, media access control (MAC) address, and stored configurations such as color, tip type, brush, and add-ons.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a similar manner and tracked by stylus detection engine 27.

Typically, output from digitizer circuitry 25 is reported to host 22. Typically, the output provided by digitizer circuitry 25 may include coordinates of one or more fingertips 140, coordinates of writing tip 20 of stylus 120 and additional information provided by stylus 120, e.g. pressure, tilt, and battery level. Typically, digitizer circuitry 25 uses both analog and digital processing to process signals detected with digitizer sensor 50. Optionally, some and/or all of the functionalities of engines 26 and 27 are integrated in one or more processing units adapted for controlling operation of digitizer sensor 50.

Optionally, some and/or all of the functionalities of digitizer circuitry 25, engines 26 and 27 are integrated and/or included in host 22. Host 22 may transmit the information to an application manager or a relevant application. Optionally, circuit 25 and host 22 may transfer the raw information to an application. The raw information may be analyzed or used as needed by the application. At least one of stylus 120, circuit 25 and host 22 may pass on the raw information without analysis or being aware of the information.

According to some exemplary embodiments, stylus 120 additionally includes a wireless communication unit 30, e.g. an auxiliary channel with Bluetooth communication, near field communication (NFC), radio frequency (RF) communication using module 23 of host 22. In some exemplary embodiments, pairing between stylus 120 and computing device 100 to define a communication configuration for the electrostatic communication channel is negotiated via the auxiliary channel. Alternatively, negotiation may be via tip 20 of stylus 120 that picks up an up-link signal transmitted via conductive strips 58 or a dedicated conductive strip that is not used for position tracking.

In some exemplary embodiments, host 22 or circuit 25 instructs stylus 120 to update or configure its transmission protocol based on analysis and reports from circuit 25 and host 22. Alternatively or additionally, stylus 120 may instruct host 22 or circuit 25 to configure its sampling and processing protocol based to accommodate input from stylus 120.

A communication configuration negotiated between a stylus 120 and computing device 100 may be stored in memory 200. Memory 200 may be local memory integrated in computing device 100 or stylus 120 or may be remote memory included in a network computer or in a cloud memory. In some exemplary embodiments, the communication configuration once defined may be fetched whenever computing device 100 and stylus 120 based on an identification code that identifies the desired configuration.

Figure 2:
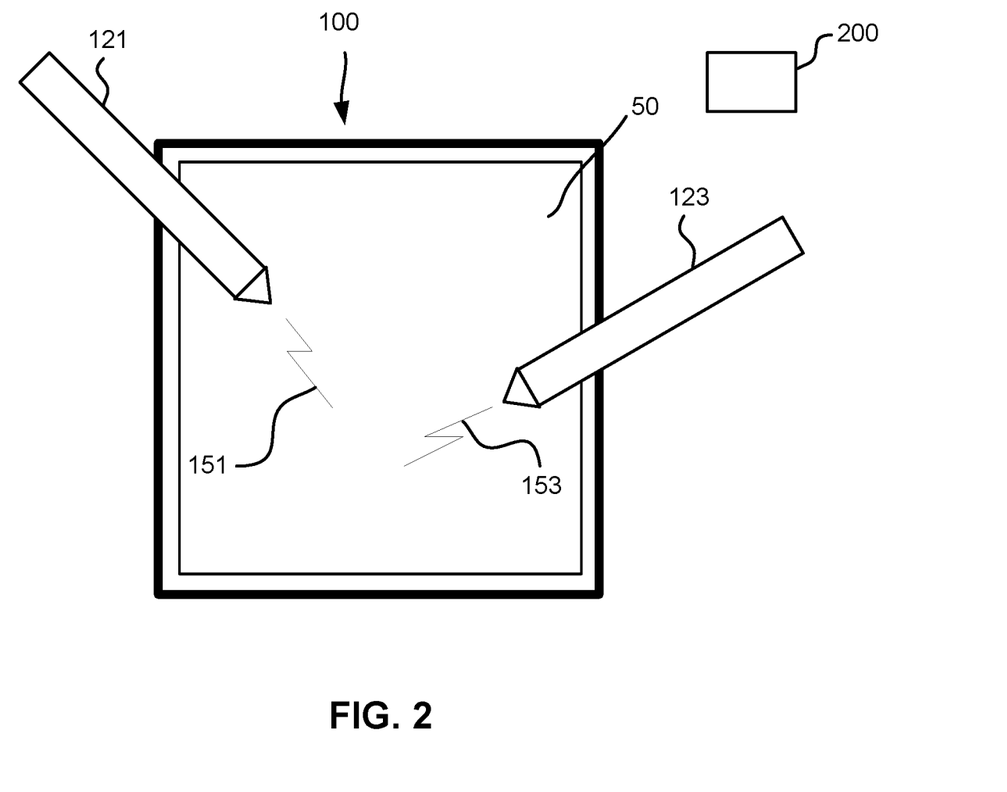
FIG. 2 is a schematic diagram of a touch enabled computing device communicating with two different styluses in accordance with some embodiments of the present disclosure.

Reference is now made to FIG. 2 showing a schematic diagram of a touch enabled computing device communicating with two different styluses in accordance with some embodiments of the present disclosure. According to some embodiments of the present disclosure, styluses 121 and 123 having different capabilities or defined operation schemes may be detected by a same touch enabled computing device 100. Optionally, different configuration may be defined for communicating with each of stylus 121 and 123. For example, stylus 121 may transmit a signal 151 based on one configuration and stylus 123 may transmit a signal 151 based on another configuration and computing device 100 may adapt itself to receive both signal 151 and signal 153. Inputs from styluses 121 and 123 may be simultaneous or consecutive.

Optionally, computing device 100 may also transmit signals to styluses 121 and 123 via digitizer sensor 50. Optionally, the configuration for transmitting signals to each of stylus 121 and stylus 123 is also different. For example, computing device 100 may transmit a first synchronization signal to stylus 121 and another synchronization signal to stylus 123. A configuration between a stylus 121 and computing device 100 as well as configuration between stylus 123 and computing device 100 may be stored in memory 200.

The different communication configurations may be defined based on the capabilities of the different styluses. Optionally, the communication configuration may be defined based on needs of an application running on computing device 100 and receiving input from a particular stylus. In one exemplary embodiment, stylus 121 may be a high-end stylus that can report more information as compared to a low-end stylus, e.g. stylus 123.

Optionally, stylus 121 can report pressure data with a high resolution, report tilt information and is capable of transmitting with higher repeat rate. Stylus 123, on the other hand may only reports pen up or pen down and may transmit at a relatively now repeat rate. Computing device 100 may agree to configure signal 151 to accommodate the capabilities of stylus 121 and configure communication channel 153 to accommodate stylus 123. Alternatively, computing device 100 may request that stylus 121 configure signal 151 to be similar to signal 153. Configuring a communication channel may include defining information transmitted, a frequency for transmission, frame timing, symbol size, symbol timing, signal modulation, baud rate and coding.

Figure 3:
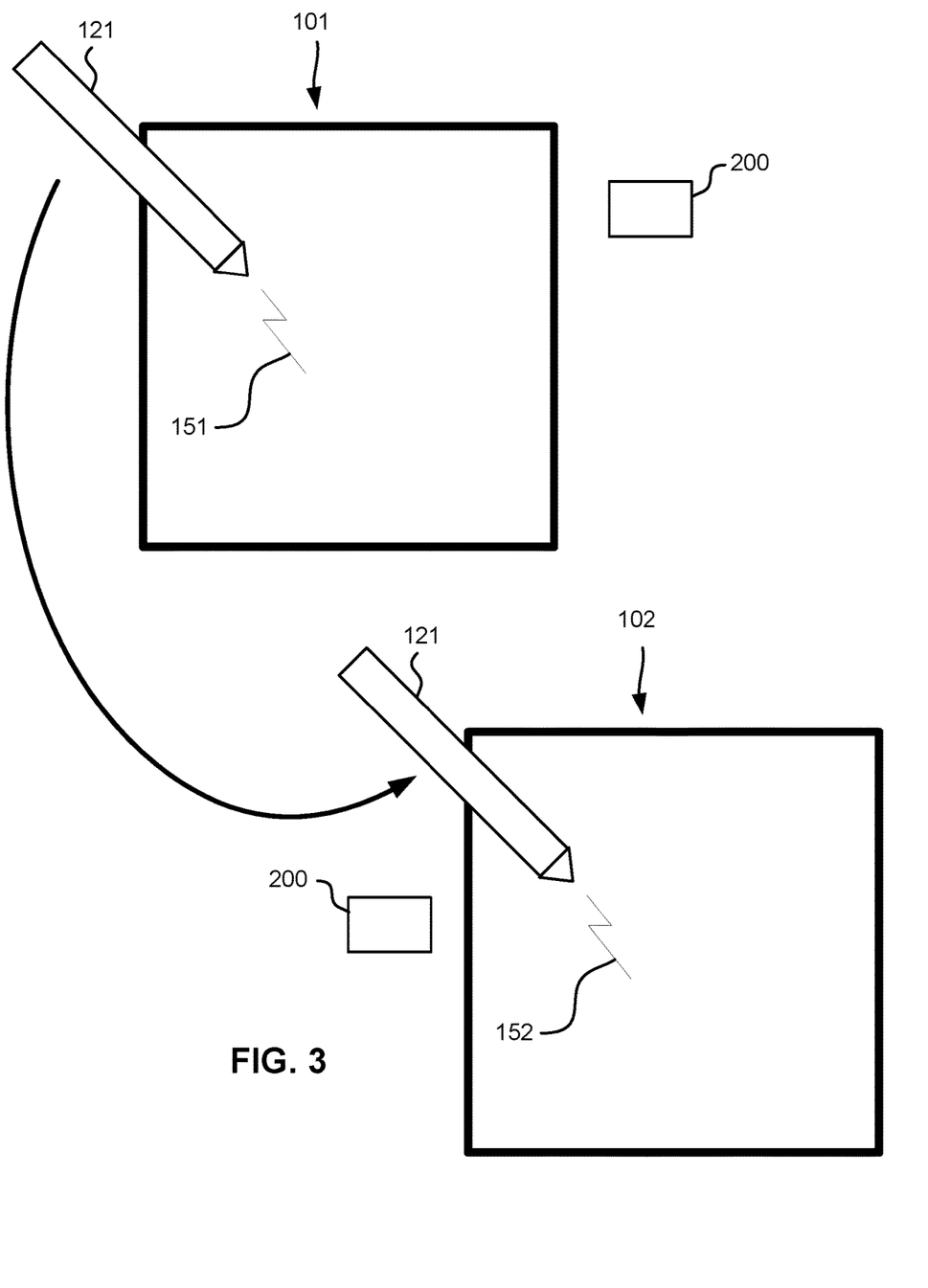
FIG. 3 is a schematic diagram of a stylus communicating with two different touch enabled computing devices in accordance with some embodiments of the present disclosure.

Reference is now made to FIG. 3 showing a schematic diagram of a stylus communicating with two different touch enabled computing devices in accordance with some embodiments of the present disclosure. In some exemplary embodiments, a same stylus 121 may communicate with one touch enabled computing device 101 using a first configuration and may communicate with another touch enabled computing device 102 using another configuration. Pairing between stylus 121 and each of computing device 101 and computing device 102 may be stored in memory 200. For example, stylus 121 may be configured to transmit signal 151 including pressure information to computing device 101 and may be configured to transmit another signal 152 including tilt information to a computing device 102. Optionally, stylus 121 is configured to transmit at a first frequency when communicating with device 101 and to transmit at another frequency when communicating with device 102.

Figure 4:
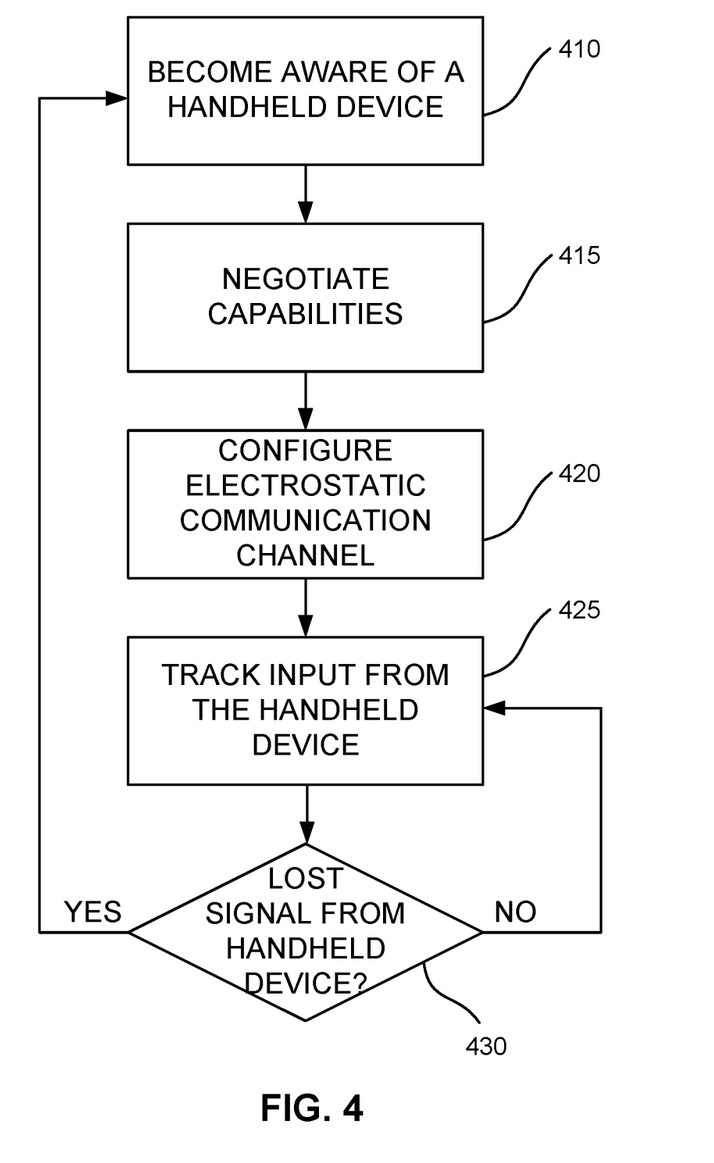
FIG. 4 is a simplified flow chart of an exemplary method for pairing a handheld device with a touch enabled computing device in accordance with some embodiments of the present disclosure.

Reference is now made to FIG. 4 showing a simplified flow chart of an exemplary method for pairing a handheld device with a touch enabled computing device in accordance with some embodiments of the present disclosure. According to exemplary embodiments of the present disclosure, pairing between a handheld device, e.g. a stylus and a computing device is initiated when the computing device becomes aware of the handheld device (block 410).

Optionally, awareness occurs as the handheld device approaches the computing device and communication between the handheld device and the computing device is established. In some exemplary embodiments, communication established via the electrostatic channel initiates pairing, e.g. responsive to the computing device detecting a beacon signal transmitted by the stylus. Optionally, pairing is initiated when the handheld device is detected on the digitizer sensor. Alternatively, pairing is initiated responsive to the handheld device establishing communication with the computing device via Bluetooth, near field communication (NFC), radio frequency communication, e.g. using electromagnetic signals and USB tethered connection.

Once awareness occurs, handheld device and computing device may negotiate capabilities via a selected communication channel (block 415). Typically, the selected communication is other than electrostatic communication channel Negotiation may include transmitting information from the handheld device to the computing device, from the computing device to the handheld device or both.

In some exemplary embodiments, the handheld device communicates identification data to the computing device and the computing device derives the capabilities of the stylus based on the identification data. Identification data may include MAC address, manufacturer information, version, e.g. original design manufacturer (ODM) versions, firmware (FW) version, and software upgrade. In some exemplary embodiments, the handheld device communicates the type of information that is stored or provided by the handheld device e.g. operating color, tip type, add-ons, button setting. Add-ons may include tilt information, e.g. from a gyroscope embedded in the handheld device. In response, the computing device may adapt the digitizer system to the reported capabilities or may transmit a request to the handheld device to adjust operating parameters. Alternatively, the computing device may transmit communication capabilities to the handheld device and the handheld device may adapt itself to the reported capabilities.

Based on negotiation, an electrostatic communication channel for tracking position of the handheld device and information is configured (block 420). Typically, the configuration defines the information that will be provided by the handheld device. Optionally, one or more of frequency, frame timing, symbol size, modulation, symbol timing, baud rate and coding is configured based on the negotiation. Optionally, during the negotiation one or more look-up tables for interpreting transmission information is provided by the handheld device, and the computing device stores and uses the look-up tables.

Optionally, the established configuration is stored and can be fetched based on an identification code that identifies the desired configuration. The configuration may be stored locally, e.g. in the stylus ASIC or in the computing device or may be stored remotely, e.g. in a network memory or a cloud memory and can be accessed remotely.

The digitizer system integrated in the computing device typically tracks input from the handheld device as long as communication between the handheld device and the computing device is maintained (block 425) In some exemplary embodiments, one or more of the handheld device and the computing device continues to transmit the configuration code that identifies the defined working configuration. Alternatively or periodically, one or more of the handheld device and the computing device continues to transmit pairing information to the other during tracking. In some exemplary embodiments, the pairing information is transmitted while the handheld device is hovering as opposed to touching the touch screen of the computing device.

In some exemplary embodiments, once the electrostatic communication channel is broken, e.g. signal from handheld device is lost pairing is reinstated (block 430) Optionally, pairing is only initiated after a pre-defined time period that electrostatic communication is broken, e.g. 1-3 seconds. In some exemplary embodiments, paring may be reinstated based on the handheld device transmitting and the computing device confirming the configuration code previously defined. Alternatively, pairing may be reinstated based on the computing device transmitting and the handheld device confirming the configuration code previously defined.

In some exemplary embodiments, the computing device communicates with the handheld device in a basic level prior to (or during) capability negotiation and then adapts the communication configuration as required based on the negotiation. Capability negotiation may occur over one or more frames. The information may be set as a single package or as multi-sub messages that might be sequential or divided by other higher priority data. Each sub-message may have a package number so that the package may be rebuilt.

The handheld device may dynamically request a change in the configuration to save power. Optionally, parameters such as transmission level, frequency, baud rate may be adjusted based on a power level of the battery in the handheld device. Optionally, a change in the configuration may be initiated due to a detected SNR ratio. Optionally, the configuration may be adjusted to improve SNR.

According to some exemplary embodiments, there is provided a method comprising: detecting presence of a handheld device in proximity of a touch enabled device; negotiating communication capabilities between the handheld device and a digitizer system of the touch enabled device; configuring at least one of the handheld device and the digitizer system to match a defined communication capability of the other of the at least one of the handheld device and digitizer system; and tracking input from the handheld device via an electrostatic communication channel between the handheld device and the digitizer system based on the defined communication configuration.

Optionally, the negotiating communication capabilities is performed via a communication channel other than the electrostatic communication channel.

Optionally, the negotiating communication capabilities is repeated periodically while communication via the electrostatic communication channel is sustained.

Optionally, the negotiating communication capabilities is repeated after a lapse in communication via the electrostatic communication channel.

Optionally, the detecting presence of a handheld device in proximity of the touch enabled device is based on input detect by the digitizer system.

Optionally, the communication capability includes at least one of frequency for transmission, frame timing, symbol size, symbol timing, signal modulation, baud rate and coding.

Optionally, the communication capability includes communicating support of reception of data related to information sensed or stored in the handheld device.

Optionally, the method includes defining a first communication configuration between a first handheld device and the digitizer sensor and defining a second communication configuration between a second handheld device and the digitizer sensor.

Optionally, the method includes defining a first communication configuration between the handheld device and a first digitizer sensor and defining a second communication configuration between the handheld device and a second digitizer sensor.

Optionally, the handheld device transmits identification information to the touch enabled computing device and wherein the computing device determines the communication capabilities of the handheld device based on the identification information.

Optionally, the negotiating communication capabilities is performed over a plurality of transmission cycles between the handheld device and the digitizer sensor.

Optionally, the input from the handheld device is tracked via the electrostatic communication channel using a first basic communication configuration prior to the configuring.

Optionally, information encoded in the input is decoded based on the defined configuration.

Optionally, the configuring includes selecting information to be provided to the touch enabled computing device by the handheld device.

Optionally, the method includes storing the defined communication configuration is association with an identification code; and configuring the at least one of the handheld device and the digitizer system based on detecting the identification information.

According to some exemplary embodiments, there is provided system comprising: a touch enabled computing device configured to detect a signal from a handheld device via an electrostatic communication channel provided by a digitizer sensor integrated on the computing device; the handheld device comprising: a circuit configured to generate the signal; and a conductive electrode from which the signal is transmitted; and wherein the handheld device and the computing device are configured to negotiate communication capabilities for the electrostatic communication channel and wherein at least one of the handheld device and the digitizer system is configured to match a defined communication capability of the other of the at least one of the handheld device and digitizer system based on the negotiating.

Optionally, the conductive electrode is a conductive tip.

Optionally, the device includes a second communication channel between the touch enabled computing device and the handheld device that is other than electrostatic communication channel, wherein negotiating communication capabilities occurs via the second communication channel.

Optionally, negotiating communication capabilities is repeated periodically while communication via the electrostatic communication channel is sustained.

Optionally, negotiating communication capabilities is repeated after a lapse in communication via the electrostatic communication channel.

According to some exemplary embodiments, there is provided system comprising a conductive tip from which the signals are transmitted or received; and a circuit in communication with the conductive tip, the circuit configured to:

generate and process signals; and negotiate communication capabilities for an electrostatic communication channel to match a defined communication capability of another device.

Optionally, the circuit is further configured to negotiate communication capabilities repeatedly based on a specified period while communication via the electrostatic communication channel is sustained.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
   detecting presence of a stylus in proximity of a touch-enabled device;
   negotiating communication capabilities between the stylus and a digitizer system of the touch-enabled device;
   selecting a first pre-defined configuration for an electrostatic communication channel between the stylus and the digitizer system based on said negotiating;
   tracking input from the stylus via the electrostatic communication channel at the first pre-defined configuration;
   detecting noise in the electrostatic communication channel that exceeds a predetermined signal-to-noise ratio;
   selecting a second pre-defined configuration for the electrostatic communication channel between the stylus and the digitizer system based on said detection of the noise exceeding the predetermined signal-to-noise ratio; and
   configuring the at least one of the stylus or the digitizer system to communicate using the second pre-defined configuration.

2. The method of claim 1, further comprising communicating between the stylus and the digitizer system using the second pre-defined configuration.

3. The method of claim 1, wherein the first pre-defined configuration or the second pre-defined configuration comprise at least one member of a group comprising symbol size, modulation, symbol timing, or baud rate.

4. The method of claim 3, wherein said negotiating communication capabilities involves initiating a negotiating session that allows at least one of the stylus or the touch-enabled device to declare capabilities, request information and configure the electrostatic communication channel.

5. The method of claim 1, wherein the electrostatic communication channel is a channel at which a conductive portion of the stylus is detected within proximity of the touch-enabled device.

6. The method of claim 1, wherein the first pre-defined configuration includes supporting reception of data related to information sensed or stored in the stylus.

7. The method of claim 1, further comprising defining a second electrostatic communication channel between a different stylus and the digitizer system.

8. The method of claim 1, further comprising defining a second electrostatic communication channel between the stylus and a second digitizer sensor.

9. The method of claim 1, wherein the stylus transmits identification information to the touch-enabled device and wherein the touch-enabled device determines the first pre-defined configuration based on the identification information.

10. The method of claim 1, wherein said negotiating communication capabilities is performed over a plurality of transmission cycles between the stylus and the digitizer system.

11. The method of claim 1, wherein the input from the stylus is tracked via the electrostatic communication channel using a first basic communication configuration prior to the configuring.

12. The method of claim 1, wherein information encoded in the input is decoded based on the first pre-defined configuration.

13. The method of claim 1, wherein the first pre-defined configuration and the second pre-defined configuration define information to be provided to the touch-enabled device by the stylus.

14. A system comprising:
   a touch-enabled device configured to detect a signal from a stylus via an electrostatic communication channel provided by a digitizer system integrated on the touch-enabled device; and
   wherein the touch-enabled device is configured to:
      detect presence of a stylus in proximity of a touch-enabled device,
      negotiate communication capabilities between the stylus and a digitizer system of the touch-enabled device,
      select a first pre-defined configuration for an electrostatic communication channel between the stylus and the digitizer system based on said negotiating,
      track input from the stylus via the electrostatic communication channel at the first pre-defined configuration,
      detect a battery level of the touch-enabled device,
      select a second pre-defined configuration for the electrostatic communication channel between the stylus and the digitizer system based on the battery level, and
      configuring the at least one of the stylus or the digitizer system to communicate using the second pre-defined configuration.

15. The system of claim 14, wherein the stylus comprises a circuit configured to generate the signal and a conductive electrode from which the signal is transmitted.

16. The system of claim 14, wherein the battery level is detected to be below a threshold battery level.

17. The system of claim 14, wherein the second pre-defined configuration comprises a different data structure or frequency of transmission than the first pre-defined configuration.

18. One more computer-storage memory devices embodied with executable instructions for enabling communications between a touch-enabled device and a stylus, comprising:

detecting presence of a stylus in proximity of a touch-enabled device;

negotiating communication capabilities between the stylus and a digitizer system of the touch-enabled device;

selecting a first pre-defined configuration for an electrostatic communication channel between the stylus and the digitizer system based on said negotiating;

tracking input from the stylus via the electrostatic communication channel at the first pre-defined configuration;

detecting a battery level of the touch-enabled device or the stylus;

selecting a second pre-defined configuration for the electrostatic communication channel between the stylus and the digitizer system based on said detection of the battery level; and configuring the at least one of the stylus or the digitizer system to communicate using the second pre-defined configuration.

19. The one or more computer-storage memory devices of claim 18, wherein the second pre-defined configuration comprises a different data structure or timing of transmission than the first pre-defined configuration.

20. The one or more computer-storage memory devices of claim 18, wherein the first pre-defined configuration or the second pre-defined configuration comprise at least one member of a group comprising symbol size, modulation, symbol timing, or baud rate.

\* \* \* \* \*